R. P. JONES.
OIL TRAP.
APPLICATION FILED MAR. 19, 1921.
1,397,891.
Patented Nov. 22, 1921.
Fig. 1.
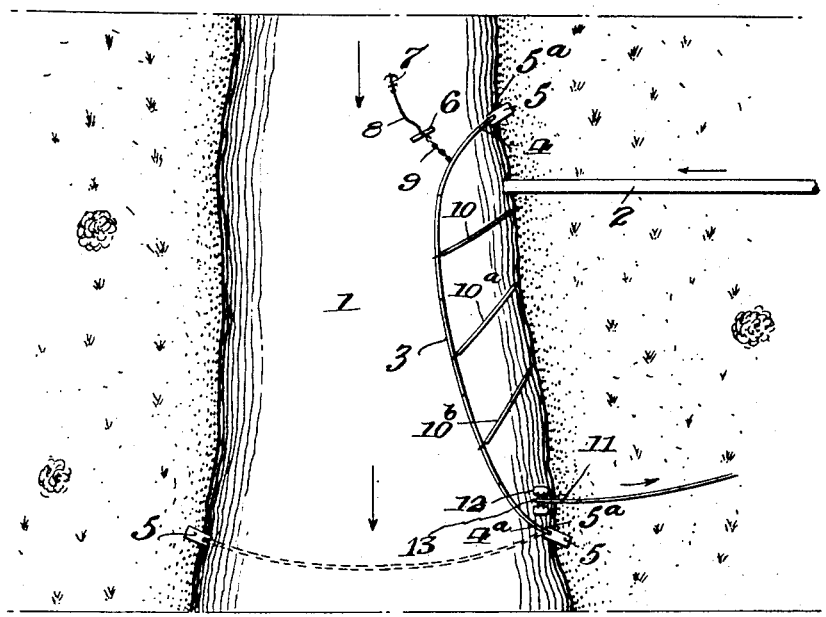
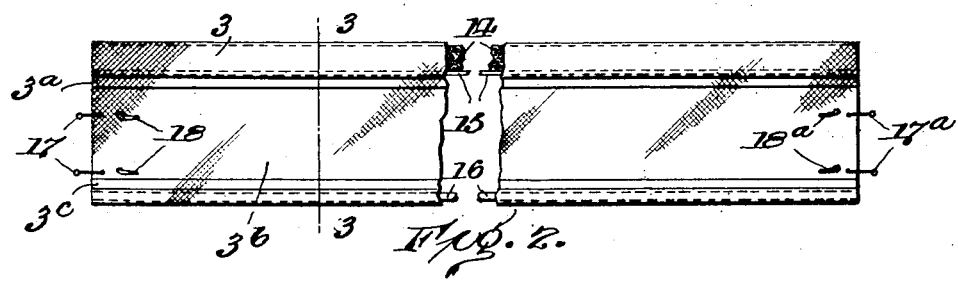
Fig. 2.
Fig. 3.
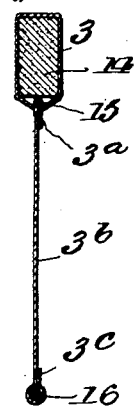
Fig. 4.
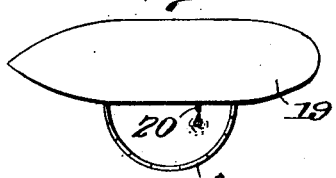
Inventor
Robert P. Jones
By Prentiss, Stone & Boyden
Attorneys.

UNITED STATES PATENT OFFICE.

ROBERT P. JONES, OF PORT ARTHUR, TEXAS.

OIL-TRAP.

1,397,891.  Specification of Letters Patent.  Patented Nov. 22, 1921.

Application filed March 19, 1921. Serial No. 453,688.

*To all whom it may concern:*

Be it known that I, ROBERT P. JONES, a citizen of the United States, residing at Port Arthur, in the county of Jefferson and State of Texas, have invented a certain new and useful Improvement in Oil-Traps, of which the following is a specification.

This invention relates to floating oil traps, booms and seines for catching floating oil or oil material on the surface of water.

One object of the invention is to provide an oil trap for catching oil floating on the surface of oil refinery discharge channels, streams, and on the surface of water wherever oily material is discharged and floats on the surface.

One feature of the invention provides for an impervious flexible and continuous wall mounted in conjunction with a series of elongated float members which are fastened together so as to permit lateral movement, but prevent relative rotary movement of the trap.

Another feature of the invention relates to the manner of securing the floating oil trap so as to permit vertical movement necessary with the rise and fall of the water and yet to maintain the efficiency of the trap. These features include the manner of positioning each member of the floats and also the particular construction used at the shore ends of the trap.

Another feature of the invention includes the details of the trap which makes it possible to float the trap to a position alongside of a ship, bring the ends to the ship's sides, and thus provide a floating trap for surface oil discharged from the ship. The trap may then be removed by bringing the extreme ends of the floating members together and towing the trap to a position where the oil may be pumped from within the trap inclosure.

Features of the present invention relate to the use of a continuous strengthening cable which extends lengthwise of the trap, a flexible weight extending lengthwise at the lower edge of the trap, and the manner of forming the trap and the details by which the floats, strengthening cable and weight are secured in position.

Other details of the invention relating to improvements and modifications of the structures forming the basis of this application are claimed in my application Serial No. 453,689.

Details relative to the anchoring of the trap in a fixed manner in the operative floating position and the details relative to the fixing of the ends of the trap are claimed in the above mentioned co-pending application. The present case provides features for the joining together of the ends of the trap, or of adjacent ends of similar traps, in which latter case two or more floating traps may be joined end to end to form an unusually long complete trap member.

The present invention provides means for forming a communicating series of traps, so arranged that oil caught in one trap may be moved progressively into and out of the separate traps to the last trap of the series and point of removal. This arrangement provides for the maintaining of batches of oil in each trap separate from the oil in the next trap. This is an important feature and assists in making possible a process of washing and sunning waste oil. The present invention also makes possible the use of a stream current to move the oil trapped.

Any suitable pumping means for removing the oil caught within the confines of the trap may be used.

Laws to prevent the pollution of streams have been passed by many States and these laws often include reference to pollution by oil. In the majority of instances, waste waters from plants handling oil, refineries and pumping stations have a substantial film of oil floating thereon. In many instances plants discharge material known as B S which is the bottom settling material from tanks or waste refinery material including the mixture of sulfuric acid and refuse oil known as acid sludge. The present invention is directed toward catching and saving these waste materials, and provides means for floating on the surface of water and anchored in a position to entrap the floating oil material, the position of the trap being such as to permit the current of water to wash the oil material to a centralized location from which it may be conveniently pumped away, the current of the stream passing beneath the under portion of the trap.

The above and other details and advantages of the invention will be described and claimed in the following specification and claims, and illustrated in the accompanying drawings, in which—

Figure 1 represents a top view of an oil trap embodying the features of the invention and positioned across the discharge end of a waste discharge pipe leading from an oil refinery. The dotted lines indicate an optional position of the trap in which position the trap extends across the stream at a point down stream from the discharge pipe.

Fig. 2 is a side view of the trap floating portion having the center broken away and showing the fastening means at the ends.

Fig. 3 is an enlarged sectional view taken on the line 3—3 of Fig. 2 and illustrating the respective positions of the float members, the reinforcing cable and the lower flexible cable weight; and Fig. 4 illustrates diagrammatically the outline of a ship's hull, and the manner of locating a trap at the side of the ship to catch waste oil pumped therefrom.

Referring in detail to the drawings, 1 indicates a stream flowing in the direction of the arrow, and having a waste discharge ditch 2 emptying therein, said ditch normally conveying waste products from a plant handling oil, such as a refinery or pumping station. A trap 3 including a substantially continuous floating boom is anchored across the mouth or outlet end of the pipe 2 or ditch, and is secured at the shore on either side of the discharge end by having the up stream end 4 of the boom and the down stream end 4$^a$ fastened to suitable masonry or concrete abutments 5 by any suitable fastening means. The abutment 5 preferably has a vertically extending slot at the outer end indicated at 5$^a$, and adapted to receive the ends of the boom to prevent leakage of any floating oil past the end of the trap. In the dotted line position in Fig. 1 a third abutment 5 is provided on the opposite side of the stream for securing the end of the boom when the boom is stretched across the stream. Additional means for anchoring the boom in the operative position opposite the discharge end of the pipe or ditch 2 is provided by a large float 6 connected to an anchor 7 which is positioned up stream and off shore from the point of attachment to the boom, so as to hold the boom away from the discharge end of the pipe 2 and prevent the down stream portion of the trap from being swung in toward the shore. A suitable connection 8 is provided between the float 6 and the anchor 7, and a second connection 9 is provided between the float 6 and the nearest portion of the boom 3. This manner of attachment makes it possible for the satisfactory anchoring of the boom and at the same time permits sufficient freedom of movement for the rise and fall of the boom with the rise and fall of the stream.

The peculiar construction which makes possible the dividing of the waste oil into separate batches is shown in Fig. 1 in which relatively short boom members 10, 10$^a$, and 10$^b$ are connected to the main boom 3 at points along its length, and extend shoreward and slightly up stream. The points of connection between the short boom members and the main boom are provided with any necessary or convenient fastening means to substantially prevent the passage of oil, and may be the particular fastening means described hereinafter as that used for the joining of the ends of main portions of the boom. The shoreward ends of the short boom members 10, 10$^a$, and 10$^b$ may be secured at or near the shore by any suitable fastening means. The slant of the short boom members down stream tends to lead any oil to a central point at the pocket formed between the boom 3 and each short boom member. When desired, the short boom members may be disconnected from the main boom 3, and the oil in each respective inclosure may be permitted to be carried by the flow of water to the next adjacent inclosure, and finally at the lower end of the boom the material still floating on the surface of the water is removed as will be described.

Oil which is collected at the lower end of the trap may be led off through a removal pipe 11 to any suitable place for storage or further treatment. The pipe 11 is provided with a pump, not shown. Two floats or casks 12 are positioned apart and rigidly secured by suitable braces. The intake pipe 13 is positioned horizontally and provided with a plurality of openings so that oil may be drawn into the pipe 13 throughout the length thereof. The pipe 13 is suitably attached to the floats 12 by any necessary braces, the manner of mounting being such that the pipe is at the level of the oil film on the water. A pipe 11 may be rigid or may be a flexible hose and may extend to a vessel for attachment to suitable pumping means. It may be possible to lead the oil directly to the shore edge at the lower or down stream end of the trap, as provided by the arrangement shown in full lines in Fig. 1, and in this form it may be unnecessary to use the floating pipe arrangement because the oil may be drawn up directly by a hose extending from the shore or from the abutment 5. The details of the mounting of the pipe 13 on the floats 12 are not claimed in this application, but are presented in the co-pending application, Serial No. 453,689.

Referring in detail to the construction of the floating portion of the trap illustrated in Figs. 2 and 3, the element 3 indicates the top portion or the float part of the floating member. This member is preferably made up in accordance with the following details of invention. A long strip of O. D. duck which may be several hundred feet long, possibly from three hundred to six hundred feet long, has one edge doubled over about six inches and sewed at its extreme edge to the main portion of the strip as indicated at 3ª, thus forming substantially a tube extending the length of the strip of duck. The main central portion of the strip is indicated at 3ᵇ and this portion may be from ten to twenty inches in width as desired, depending on the requirements of the trap and the relative buoyancy of the floats and the weight members which may be used. The opposite edge of the strip is doubled over for about two inches along the entire length of the strip and sewed as indicated at 3ᶜ. The first mentioned larger tube portion is to constitute the upper portion of the trap and the smaller tube is designed to be the lower edge of the trap when the apparatus is in the operative position. Float members 14 are inserted in the larger tube as shown in Figs. 2 and 3, and these float members may be cork slabs having dimensions 2″ x 4″ x 30″. A flexible steel wire cable about ¼ inch in size is inserted in the larger tube adjacent the float members and extends substantially the length of the float member or boom 3. This cable is indicated at 15. At the opposite side of the strip in the smaller tube is inserted a long relatively stiff cable about one-half inch in size and preferably of galvanized wire material, and also extending the length of the trap. This larger cable is indicated at 16.

The size of the float members 14 may be varied as desired, but these members should normally have their adjacent ends abutting. The float members 14, the strengthening cable 15 and the weight cable 16 may be incorporated in their operative positions in any convenient manner, whether held in position while the material of the strip is sewed, or inserted at convenient points in the strip after the tubes have been formed.

Fastening means for securing the ends of the strip together or for securing adjacent ends of a plurality of float members is illustrated in Fig. 2. At one end of the member 3 are the eyelets 17 extending beyond the end of the strip. Snap hooks 18 are secured to the strip at one side of the eyelets. At the opposite end of the strip are corresponding eyelets 17ª and hooks 18ª. When the ends of the strip are brought together, as when it is desirable to tow the float portion of the trap with oil entrapped therein, the eyelets 17ª are fitted into engagement over the hooks 18 and the eyelets 17 are fitted into hooked engagement with the members 18ª. Similarly, the adjacent ends of float members provided with the same type of fastening means may be joined end to end. Also, in a similar manner the short length boom members 10, 10ª and 10ᵇ may have corresponding eyelets and hooks adapted to engage with the eyelets and hooks respectively on the main boom member 3.

The present invention, by using a continuous strengthening cable as indicated at 15 and a continuous lengthwise relatively stiff cable as a weight indicated at 16, has provided for the increased usefulness of the trap. The current of water beneath the trap is prevented from washing away the oil both when the trap is positioned in a fixed anchorage location and when it is being towed. Without these details and without a relatively stiff wire weight at the bottom a material loss is likely due to the movement of water relative to the trap.

In Fig. 4, a ship 19 is illustrated diagrammatically with a floating trap embodying some of the features of this invention drawn up to the ship's side. It is presumed that the ship is discharging oily water from a pipe 20 or discharging waste oil which may remain in an oil ship's hold. This waste product may contain much valuable oil which may be saved by the use of this floating trap. The type of trap readily used for work of this nature is of light construction having float members with a cross section of about one and one-half inches and a length of four or five feet. The continuous strip of flexible material constituting a vertically positioned curtain is provided in exactly the same manner as illustrated in Fig. 2. For quickly moving the light construction trap for purposes such as illustrated in Fig. 4, rowboats may readily bring the ends of the trap together and drag the trap and inclosed film of oil to the shore or to a convenient location for pumping or otherwise removing the oil from within the confines of the trap.

The apparatus has performed very satisfactorily and has brought about remarkable results by making possible a change in the nature of the trapped oil materials. Such materials while in the confines of the trap have in some instances been changed from substantially useless to relatively marketable materials by changes which may have been caused by the action of the water, the sun and elements, or both.

Details of the present invention have been successfully used with a resultant saving of considerable amounts of oil, and have made it possible to adequately comply with the laws regulating stream pollution.

I claim:

1. An oil trap comprising a plurality of float members capable of floating on water and arranged end to end, connective means securing said float members in position end to end and providing for lateral movement of said float members, and a substantially vertically extending flexible curtain substantially impervious to liquids connected to adjacent float members.

2. An oil trap comprising a plurality of float members capable of floating on water and arranged end to end, connective means securing said float members in position end to end, a flexible curtain substantially impervious to liquids connected with adjacent float members and extending substantially vertically, and means for securing said float members in any predetermined position.

3. An oil trap comprising a plurality of float members capable of floating on water and arranged end to end, connective means securing said float members in position end to end and providing for lateral movement of said float members, and a continuous flexible curtain substantially impervious to liquids connected to each of said float members and positioned substantially vertically.

4. An oil trap comprising a plurality of float members capable of floating on water and arranged end to end, connective means securing said float members in position end to end and providing for lateral movement of said float members, a continuous flexible curtain substantially impervious to liquids connected to each of said float members and positioned substantially vertically, and a weight on the lower edge of said curtain.

5. An oil trap comprising a boom adapted to receive a flow of oil and water and including a plurality of float members capable of floating on water and arranged end to end, a curtain substantially impervious to liquids secured to adjacent float members connecting the same and extending substantially the length of said boom and below the lower edge of said float members, and fastening means on each end of the boom for securing the ends of the boom in predetermined positions.

6. An oil trap comprising an elongated strip of flexible material substantially impervious to liquids, float members capable of floating on water secured to one edge portion of said strip, and a flexible elongated weight secured to the opposite edge portion of said strip and extending lengthwise of the same.

7. An oil trap comprising an elongated strip of flexible material substantially impervious to liquids, float members capable of floating on water secured to one edge portion of said strip, a flexible reinforcing cable secured to said strip adjacent said float members and extending substantially the entire length of said trap, and a flexible elongated weight secured to the opposite edge portion of said strip and extending lengthwise of the same.

8. An oil trap comprising an elongated strip of flexible material substantially impervious to liquids having one edge folded lengthwise and secured to the main portion and thus forming a tube extending lengthwise of said strip, a plurality of float members positioned within said tube, a continuous flexible reinforcing cable extending through said tube and substantially the length of said trap, and flexible elongated weight means secured to the other edge of said strip and extending lengthwise of the same.

9. An oil trap comprising an elongated strip of flexible material substantially impervious to liquids having one edge folded lengthwise and secured to the main portion and thus forming a tube extending lengthwise of said strip, a flexible elongated cable positioned within said tube and constituting a weight member, and float members capable of floating on water secured to the opposite edge of said strip.

10. In an oil trap an elongated strip of flexible material having the opposite edges folded lengthwise and secured to said main portion thereof and thus forming tubes extending lengthwise of said strip at the margins and leaving a broad portion of the strip between the tubes.

11. An oil trap comprising an elongated strip of flexible material having the opposite edges folded lengthwise and secured to the main portion thereof and thus forming tubes extending lengthwise of said strips at the margins and leaving a broad portion of the strip between the tubes, float members positioned within one tube, a flexible reinforcing cable secured to said strip adjacent said float members and extending lengthwise of said strip, and a flexible elongated weight positioned within the tube on the side of the strip opposite to that tube containing the floats.

12. An oil trap comprising an elongated strip of flexible material, float members capable of floating on water secured to one edge portion of said strip, a flexible elongated weight secured to the opposite edge portion of said strip and extending lengthwise of the same, and means to secure said trap in a floating position on a body of water.

13. An oil trap comprising an elongated strip of flexible material, float members capable of floating on water secured to one edge portion of said strip, a flexible reinforcing cable secured to said strip adjacent said float members and extending substantially the entire length of said trap, a flexible elongated weight secured to the opposite edge portion of said strip and extending lengthwise of the same, and means to secure said trap in a floating position on a body of water.

14. An oil trap comprising an elongated strip of flexible material substantially impervious to liquids having one edge folded lengthwise and secured to the main portion and thus forming a tube extending lengthwise of said strip, a plurality of float members positioned within said tube, a continuous flexible reinforcing cable extending through said tube and substantially the length of said trap, flexible elongated weight means secured to the other edge of said strip and extending lengthwise of the same, and means to secure said trap in a floating position on a body of water.

15. An oil trap comprising an elongated strip of flexible material substantially impervious to liquids having one edge folded lengthwise and secured to the main portion and thus forming a tube extending lengthwise of said strip, a flexible elongated cable positioned within said tube and constituting a weight member, float members capable of floating on water secured to the opposite edge of said strip, and means to secure said trap in a floating position on a body of water.

16. An oil trap comprising an elongated strip of flexible material having the opposite edges folded lengthwise and secured to the main portion thereof and thus forming tubes extending lengthwise of said strips at the margins and leaving a broad portion of the strip between the tubes, float members positioned within one tube, a flexible reinforcing cable secured to said strip adjacent said float members and extending lengthwise of said strip, a flexible elongated weight positioned within the tube on the side of the strip opposite to that tube containing the floats, and means to secure said trap in a floating position on a body of water.

17. An oil trap comprising an elongated strip of flexible material substantially impervious to liquids, float members capable of floating on water secured to one edge portion of said strip, a flexible elongated weight secured to the opposite edge portion of said strip and extending lengthwise of the same, and separate fastening means on each end of said strip adapted to coöperate with the fastening means on the opposite end or a corresponding end for joining ends of similar strip members together.

18. An oil trap comprising a main portion and branch portions, said main portion comprising an elongated strip of flexible material, float members capable of floating on water secured to one edge portion of said strip, a flexible elongated weight secured to the opposite edge portion of said strip and extending lengthwise of the same, and means to secure said main portion in a floating position on a body of water, and said branch portions each being of the same construction as said main portion and detachably secured at one end to said main portion at predetermined points along the length thereof, and extending from said main portion to form a plurality of pockets which are bounded by said floating trap.

19. An oil trap comprising a boom adapted to receive a flow of oil and water and including a plurality of float members capable of floating on water, a curtain secured to adjacent float members and extending substantially vertically downward, and fastening means to secure said trap in a floating position on a body of water comprising a secondary float member, an anchor, a connection between said anchor and said secondary float member, and another connection between said secondary float member and said trap.

20. An oil trap comprising a boom adapted to receive a flow of oil and water and including a plurality of float members capable of floating on water, a curtain secured to adjacent float members and extending substantially vertically downward, and fastening means to secure said trap in a floating position on a body of water including an anchor and a long connection between said anchor and said trap.

21. An oil trap comprising a boom adapted to receive a flow of oil and water and including a plurality of float members capable of floating on water, a flexible curtain secured to adjacent float members and extending lengthwise of said boom and below the lower edge of said float members, fastening means for securing the ends of the boom in predetermined positions, branch boom members detachably connected to said boom member along the length thereof and extending laterally therefrom, and fastening means for securing the free ends of said branch boom members.

22. An oil trap for catching waste oil matter discharged into a stream of water, which trap comprises a main elongated float member extending from a point adjacent the shore and up stream from said point of oil discharge toward a point below said point of oil discharge and thence shoreward, means for securing both ends of said float member, means for anchoring said float member in a floating position and spaced from the shore along its length, and a supplemental float member detachably secured at one end to said main float member and extending shoreward and thus dividing the confines of said trap into a plurality of inclosures.

23. An oil trap for catching waste oil matter discharged into a stream of water, which trap comprises a main elongated float member extending from a point adjacent the shore and up stream from said point of oil discharge toward a point below said point of oil discharge and thence shoreward, means for securing both ends of said float member, means for anchoring said float member in a floating position and spaced from the shore along its length, and a supplemental float member detachably secured at one end to said main float member and extending shoreward and thus dividing the confines of said trap into a plurality of inclosures, the shoreward end of said supplemental float member being up stream as compared to the end adjacent the main float member so that the material caught within the confines of the inclosure is led by the movement of water toward the point of attachment of the supplemental float member to said main float member.

24. An oil trap comprising a boom adapted to receive a flow of oil and water and including a plurality of float members capable of floating on water and arranged end to end with adjacent ends hinged together, and a flexible curtain substantially impervious to liquids secured to adjacent float members and extending substantially vertically downward.

25. An oil trap comprising a boom adapted to receive a flow of oil and water and including a plurality of float members capable of floating on water and arranged end to end with adjacent ends hinged together, a flexible curtain substantially impervious to liquids secured to adjacent float members and extending substantially the length of said boom and below the lower edge of said float members, and fastening means on each end of the boom for securing the ends of the boom in predetermined positions.

In testimony whereof I affix my signature.

ROBERT P. JONES.